(12) United States Patent
Vertechy et al.

(10) Patent No.: US 8,020,465 B2
(45) Date of Patent: Sep. 20, 2011

(54) PARALLEL SPHERICAL MECHANISM WITH TWO DEGREES OF FREEDOM

(75) Inventors: Rocco Vertechy, Carpi (IT); Carlo Menon, Rovigo (IT); Vincenzo Parenti Castelli, Bologna (IT)

(73) Assignee: Agence Spatiale Europeenne, Paris Cedex (FR)

( * ) Notice: Subject to any disclaimer, the term of this patent is extended or adjusted under 35 U.S.C. 154(b) by 1005 days.

(21) Appl. No.: 11/802,401

(22) Filed: May 22, 2007

(65) Prior Publication Data

US 2008/0072699 A1   Mar. 27, 2008

(30) Foreign Application Priority Data

May 24, 2006 (FR) .................... 06 04744

(51) Int. Cl.
*F16M 11/12* (2006.01)
(52) U.S. Cl. ............ 74/490.01; 74/490.05; 901/18
(58) Field of Classification Search ........... 74/490.01, 74/490.03, 490.05; 901/14, 15, 16, 18
See application file for complete search history.

(56) References Cited

U.S. PATENT DOCUMENTS

| | | | |
|---|---|---|---|
| 5,966,991 A | 10/1999 | Gosselin et al. | |
| 6,290,196 B1 * | 9/2001 | Mayenberger | 248/274.1 |
| 6,301,988 B1 * | 10/2001 | Brogårdh | 74/490.03 |
| 6,330,837 B1 * | 12/2001 | Charles et al. | 74/490.06 |
| 6,378,190 B2 * | 4/2002 | Akeel | 29/407.08 |
| 6,841,964 B2 * | 1/2005 | Osuka et al. | 318/568.21 |
| 6,974,297 B2 * | 12/2005 | Brogårdh | 414/680 |
| 7,011,489 B2 * | 3/2006 | Brogardh et al. | 414/735 |
| 7,386,408 B2 * | 6/2008 | Nishibashi et al. | 702/94 |
| 2004/0086351 A1 * | 5/2004 | Kim et al. | 409/235 |

FOREIGN PATENT DOCUMENTS

EP   0 314 839   5/1989

(Continued)

OTHER PUBLICATIONS

G. Dunlop et al., "Position analysis of a two DOF parallel mechanism—the Canterbury tracker", *Mechanism and Machine Theory* 34 (1999), pp. 599-614.

(Continued)

*Primary Examiner* — William C Joyce
(74) *Attorney, Agent, or Firm* — Clark & Brody

(57) ABSTRACT

A parallel spherical mechanism with two degrees of freedom for connecting a body to a fixed base in such a manner as to enable it to be oriented in three dimensions by turning about a first axis that is fixed relative to said fixed base, and about a second axis that is fixed relative to said body for orienting, these two axes intersecting at a center of spherical motion situated in said body for orienting, wherein: it comprises at least four links, each of said links being connected to said fixed base via a first connection point and to said body for orienting via a second connection point, and each link belonging to a first type or a second type, there being at least one link of each type, in which: in the link(s) of the first type, the first connection point is at any point of said fixed base, and the second connection point coincides with said center of spherical motion situated in said body for orienting: and in the link(s) of the second type, the first connection point lies on said first axis and the second connection point lies on said second axis, but does not coincide with said center of spherical motion; each connection point of said links lying on said first and/or second axis presents at least one degree of freedom in rotation about said axis.

16 Claims, 3 Drawing Sheets

FOREIGN PATENT DOCUMENTS

| | | |
|---|---|---|
| EP | 0 668 130 | 8/1995 |
| GB | 2 173 472 | 10/1986 |
| WO | 87/03239 | 6/1987 |
| WO | 93/01577 | 1/1993 |
| WO | 2004/010043 | 1/2004 |

OTHER PUBLICATIONS

G. Gogu, "Fully-Isotropic Over-Constrained Parallel Wrists with Two Degrees of Freedom", *Proceedings of the 2005 IEEE Intl. Conference on Robotics and Automation*, Barcelona, Spain, Apr. 2005, pp. 4014-4019.

R.M. Warden et al., "Pancam Mast Assembly on Mars Rover", *Proceedings of the 37th Aerospace Mechanisms Symposium*, Johnson Space Center, May 19-21, 2004, pp. 263-276.

J.M. Wiitala et al., "Design of an Overconstrained and Dextrous Spherical Wrist", Design Innovation Brief, *Journal of Mechanical Design*, Sep. 2000, vol. 122, pp. 347-353.

R.J. Bauer, "Kinematics and dynamics of a double-gimbaled control moment gyroscope", *Mechanism and Machine Theory* 37 (2002), pp. 1513-1529.

R. Baumann et al., "The PantoScope: A Spherical Remote-Center-of-Motion Parallel Manipulator for Force Reflection", *Proceedings of the 1997 IEEE Intl. Conference on Robotics and Automation*, Albuquerque, NM, Apr. 1997, pp. 718-723.

M. Carricato et al., "A Novel Fully Decoupled Two-Degrees-of-Freedom Parallel Wrist", *The Intl. Journal of Robotics Research*, vol. 23, No. 6, Jun. 2004, pp. 661-667.

\* cited by examiner

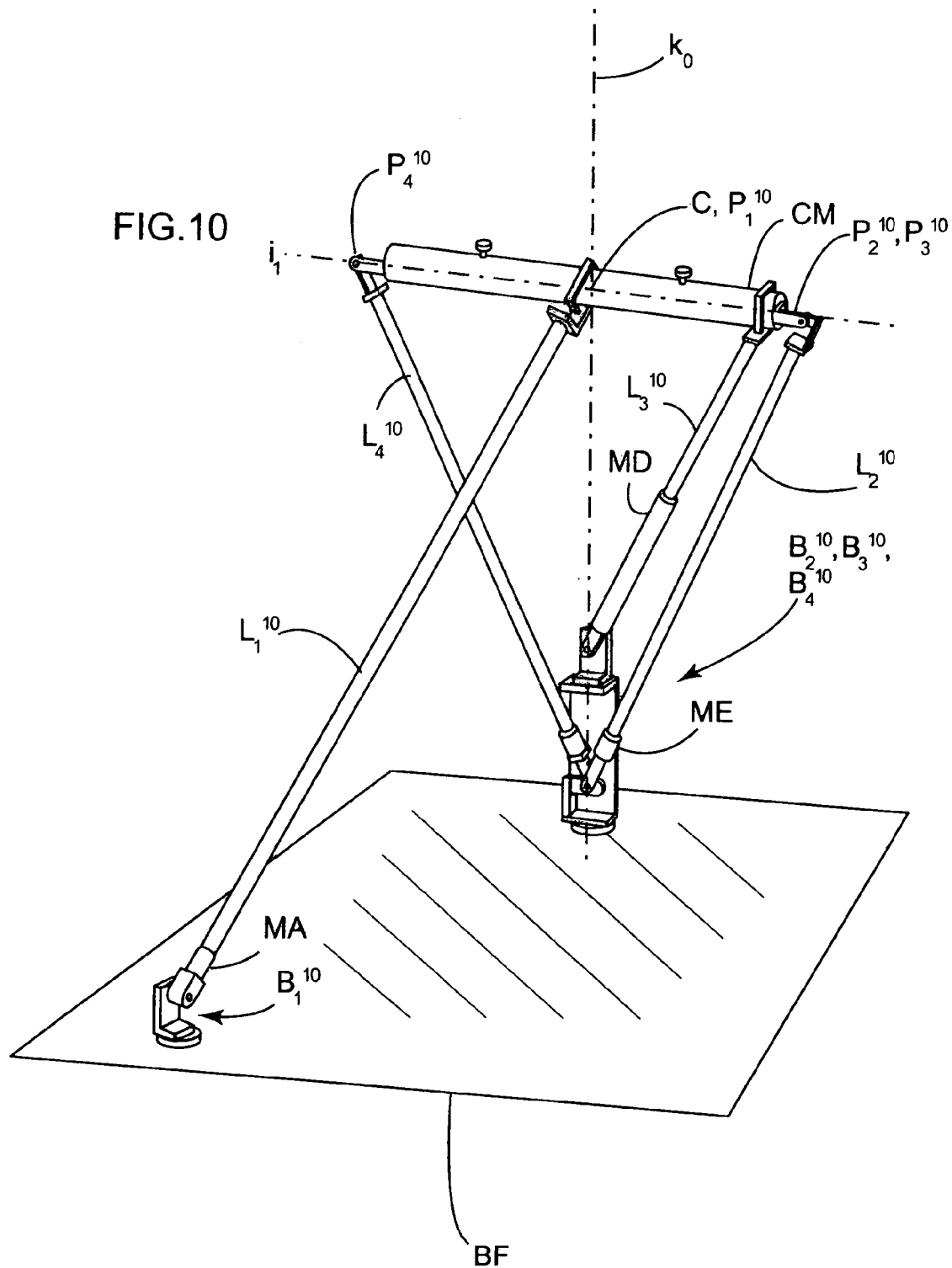

PARALLEL SPHERICAL MECHANISM WITH TWO DEGREES OF FREEDOM

The invention relates to a parallel spherical mechanism with two degrees of freedom, the mechanism being of the "wrist" type for connecting a body to a fixed base so as to enable the body to be oriented in three-dimensional space.

FIELD OF THE INVENTION

The invention can find numerous practical applications, in particular in the space industry, in robotics, and in medicine. Amongst these applications, mention can be made of systems for pointing mirrors, antennas, or cameras, systems for directing laser beams, manipulators, industrial robots, machine tools, etc.

BACKGROUND OF THE INVENTION

Numerous mechanisms known in the prior art enable a body (commonly referred to as a "platform") to be oriented in three dimensions by being turned about two or three axes. When the body for orienting presents an axis of symmetry, turning the body about its own axis of symmetry is generally not useful (it suffices to think of the reflector of a parabolic antenna or a telescope): under such circumstances, which occur frequently in practice, it suffices to use an orienting mechanism having two degrees of freedom.

A "wrist" is an orienting mechanism presenting motion of spherical type: when such a mechanism is used, each point of the body for orienting moves over a spherical surface. The center of spherical motion may be situated inside or outside the body for orienting.

In an orienting mechanism, it is not always necessary to allow for the possibility of the body for orienting to be able to perform complete revolutions about its movement axes. Under such circumstances, it is advantageous to use a parallel mechanism, i.e. a mechanism comprising a plurality of independent kinematic linkages connecting said body for orienting to the fixed base. Parallel mechanisms are small in terms of size and mass, while simultaneously presenting a high degree of stiffness. These characteristics are particularly appreciated in the aerospace industry, for example.

Very few parallel mechanisms with two degrees of freedom presenting spherical motion (wrist) are known in the prior art. Those mechanisms belong to two classes:
- so-called "spherical architecture" wrists that comprise only revolute joints whose axes intersect in the center of spherical motion; and
- wrists of non-spherical architecture, that do not satisfy that condition.

Two examples of spherical architecture wrists are given in U.S. Pat. No. 5,966,991 (a so-called "agile eye" mechanism) and in the article by J. M. Wiitala and M. M. Stanisic entitled "Design of an overconstrained dextrous spherical wrist", Journal of Mechanical Design, Vol. 122, pp. 374-353, 2000.

Those mechanisms are overconstrained and they obtain spherical motion of the platform by using the common constraints of the spherical mechanisms. The main drawbacks of those architectures are the fact that the spherical motion axes are not predetermined, i.e. they are not fixed, neither relative to the base nor relative to the platform, and the movements in rotation about said axes cannot be decoupled. In addition, the fact that they are intrinsically overconstrained leads to high levels of internal mechanical stress and a major risk of jamming.

Wrists of non-spherical architecture are described in particular in the following articles:

G. R. Dunlop, T. P. Johnes, "Position analysis of a two DOF parallel mechanism—the Canterbury tracker", Mechanism and Machine Theory, Vol. 34, pp. 599-614, 1999;

R. Baumann, W. Maeder, D. Glauser, and R. Clavel, "The PantoScope: a spherical remote-center-of-motion parallel manipulator for force reflexion", Proc. IEEE Int. Conf. Robotics and Automation, pp. 718-723, 1997;

M. Carricato, V. Parenti Castelli, "A novel fully-decoupled two degrees-of-freedom parallel wrist", The International Journal of Robotics Research, Vol. 23, pp. 661-667, 2004;

J. R. Bauer, "Kinematics and dynamics of a double-Gimbaled control moment gyroscope", Mechanism and Machine Theory, Vol. 37, pp. 1513-1529, 2002; and G. Gogu, "Fully-isotropic overconstrained parallel wrists with two degrees of freedom", Proc. IEEE Int. Conf. Robotics and Automation, pp. 4025-4030, 2005.

The first two above-mentioned mechanisms present two axes of motion that are not predetermined, and consequently motions in rotation that are not decoupled. In addition, they are bulky.

The other three mechanisms present predetermined axes and enable motion in rotation to be decoupled, but they are nevertheless penalized by their size. In addition, the mechanism of M. Carricato and V. Parenti Castelli, and the mechanism of G. Gogu contain prismatic joints that can affect their operation negatively, in particular in space applications (lubrication problems) and in micromechanical applications (high levels of friction).

OBJECTS AND SUMMARY OF THE INVENTION

An object of the invention is to provide a parallel spherical orienting mechanism ("wrist") having two degrees of freedom that makes it possible to solve the above-mentioned drawbacks of the prior art, at least in part.

The architecture of a mechanism of the invention presents axes that are predetermined, which enables motions in rotation about said axes to be decoupled. Advantageously, such a mechanism presents a structure that is simple and compact, operation that is reliable, and a very high degree of stiffness.

The invention provides a parallel spherical mechanism ("wrist") with two degrees of freedom for connecting a body (or platform) to a fixed base in such a manner as to enable it to be oriented in three dimensions by turning about a first axis that is fixed relative to said fixed base, and about a second axis that is fixed relative to said body for orienting, these two axes intersecting at a center of spherical motion situated in said body for orienting, wherein:

it comprises at least four links, each of said links being connected to said fixed base via a first connection point and to said body for orienting via a second connection point, and each link belonging to a first type or a second type, there being at least one link of each type, in which:

in the link(s) of the first type, the first connection point ($B_1$, ...) is at any point of said fixed base (BF) that does not lie on said first axis ($k_0$), and the second connection point ($P_1$, ...) coincides with said center of spherical motion (C) situated in said body (PM) for orienting: and in the link(s) of the second type, the first connection point ($B_2$, ...) lies on said first axis ($k_0$) and the second connection point ($P_2$, ...) lies on said second axis ($i_1$);

each connection point of said links lying on said first and/or second axis presents at least one degree of freedom in rotation about said axis.

In a preferred embodiment, said first and second connection points are made using two spherical joints, or one spherical joint and one universal joint.

Alternatively, at least one of the connection points that does not lie on either of the two axes of rotation constitutes a rigid or elastic connection.

In a first embodiment of the invention, the mechanism has exactly four links and in which the first connection points of said links of the first type are in alignment along a straight line that passes through the center of spherical motion (C) but does not coincide with said first axis of rotation, and the axes of the links of the second type lie in the plane defined by said first and second axes of rotation.

In a second embodiment of the invention, the mechanism has exactly four links and in which the axes of the links of the first type are coplanar, with none of them being in alignment with said first axis of rotation, while the axes of the links of the second type belong to a plane bundle of straight lines lying in the plane defined by said first and second axes of rotation.

In a third embodiment of the invention, the mechanism has exactly four links and in which the axes of the links of the first type belong to a bundle of straight lines centered on the center of spherical motion, while the axes of the links of the second type are colinear and do not pass via said center of spherical motion.

A fourth embodiment of the invention is obtained by adding at least one additional link of the first or second type to a mechanism in accordance with the first, second, or third embodiments. In such a mechanism, said links are constituted by compression beams or by cables, at least one link being constituted by a compression beam.

Independently of the embodiment under consideration, at least one of said links is of variable length, so as to enable the distance between said fixed base and said center of spherical motion situated in said body for orienting to be modified. The mechanism can thus be retracted and deployed. In particular, said link(s) of variable length can be bistable telescopic links. Advantageously, at least one of said links of variable length includes a linear actuator in order to vary its length in active manner.

Advantageously, at least one of said links of variable length includes an integrated actuator and sensor for damping vibration or compensating deflections of said mechanism.

A mechanism of the invention may include at least two actuators for orienting said body in three dimensions by rotation about said first and second axes of rotation.

In a first variant, said two actuators may comprise:
a first prismatic actuator connected to said base by a first connection point lying on said first axis and to said body for orienting via a second connection point not lying on either axis of rotation; and
a second prismatic actuator connected to said base via a connection point not lying on either axis of rotation, and to said body for orienting via a second connection point lying on said second axis.

In a first variant, the two actuators are designed to actuate one or two of said connection points in turning.

BRIEF DESCRIPTION OF THE DRAWINGS

Other characteristics, details, and advantages of the invention appear on reading the following description made with reference to the accompanying drawings given by way of example and showing respectively:

FIG. 10, an example of an application of the mechanism of the invention.

MORE DETAILED DESCRIPTION

Figure 2:
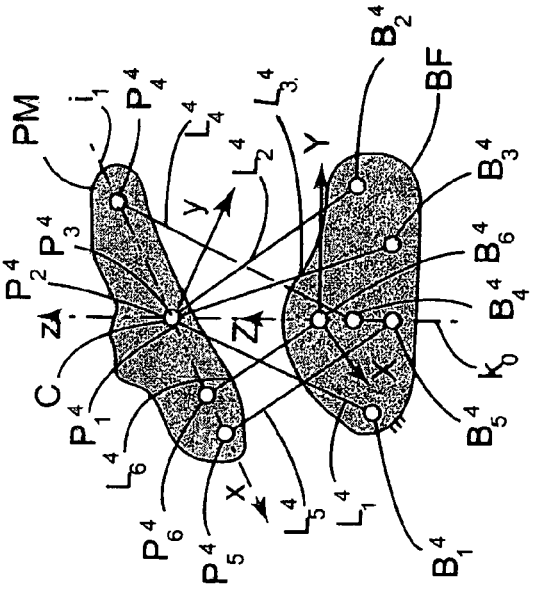
FIG. 2, a theoretical diagram of a passive mechanism in a second embodiment of the invention.

A mechanism of the invention comprises a fixed base BF, a moving platform PM, and n link elements or "links" $L_1$, $L_2, \ldots, L_n$ where n is equal to or greater than four (in the figures, a superscript identifies the Figure in question: thus $L_1^2$ is the first link of FIG. 2). Each link $L_i$ is connected to the base BF by a first connection point $B_i$ situated at one of its ends, and to the platform PM by a second connection point $P_i$ situated at its opposite end. A connection point may be a rigid connection (zero degrees of freedom), an elastic connection, or indeed a revolute joint (one degree of freedom in rotation), a universal joint (two degrees of freedom in rotation), or a spherical joint (three degrees of freedom in rotation). The mechanism presents two imposed axes of rotation about which the platform PM can turn: a first axis $k_0$ that is fixed relative to the base PF, and a second axis $i_1$ that is fixed relative to the platform PM. These two axes, which are not necessarily perpendicular, intersect at a point C that belongs to the platform PM and constitutes the center of spherical motion of the mechanism.

The links $L_i$ may belong to a first type or to a second type, with at least one link per type and a total of four or more links:
in a link of the first type ($L_1^1$ in FIG. 1, $L_1^2$ and $L_2^2$ in FIG. 2, $L_1^3$, $L_2^3$, and $L_3^3$ in FIG. 3), the first connection point is any point of the base BF that does not lie on the first axis $k_0$, while the second connection point coincides with the center C of spherical motion;
in a link of the second type ($L_2^1$, $L_3^1$, and $L_4^1$ in FIG. 1, $L_3^2$, and $L_4^2$ in FIG. 2, $L_4^3$, $L_5^3$, and $L_6^3$ in FIG. 3), the first connection point lies on the first axis of rotation $k_0$ and the second connection point lies on the second axis of rotation $i_1$.

A connection point that lies on an axis of rotation must present at least one degree of freedom in rotation about said axis. Thus, for example, the connection point $P_1^1$ of FIG. 1 that coincides with the center of motion C, can be made using a universal joint, the point $B_1^1$ that does not lie on any axis of rotation (said to be an "inactive" joint or connection point) can be constituted by a rigid connection, while the connection points $B_2^1$ and $P_2^1$ can be made using revolute joints having its axis of rotation coinciding with $k_0$ and $i_1$, respectively.

It is advantageous for the connection points to present additional degrees of freedom, so as to avoid accumulating torsion stresses that would make it necessary overdimension the links. Thus, in a preferred embodiment of the invention, all of the connection points $B_i$ are made using spherical or universal joints, and the connection points $P_i$ using spherical joints.

It is also possible to use spherical or universal joints for only some of the connection points.

In another advantageous embodiment, the inactive connection points such as $B_1^1$ comprise compliant connections, thus making it possible to limit flectional and torsional stresses acting on the links.

A mechanism of the invention may also include other links that belong neither to the first type nor to the second type, providing they do not impede turning movement about the imposed axes $k_0$ and $i_1$. An example is constituted by the mechanism of FIG. 8, which includes two additional telescopic links $LA_1$ and $LA_2$.

By combining links of the first and second types, four families of mechanism of the invention can be obtained in particular.

Figure 1:
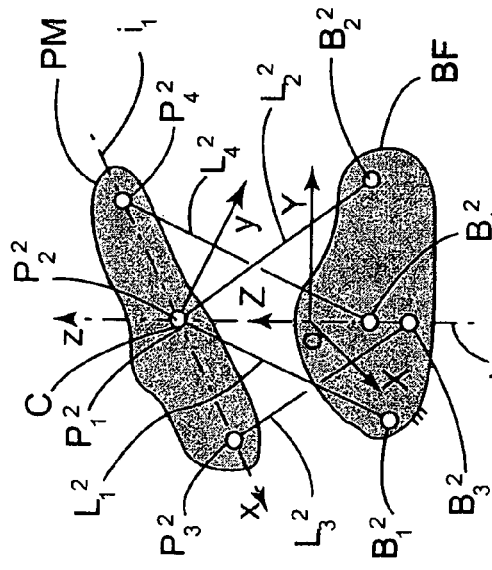
FIG. 1, a theoretical diagram of a passive mechanism in a first embodiment of the invention.

FIG. 1 shows a mechanism belonging to the first family. Such a mechanism has exactly four links and:
  the first connection points ($B_i$) of the links of the first type (if there are more than one) lie on a common straight line passing through the center of motion C, but with a direction different from the direction of the first axis of rotation $k_0$. In FIG. 1, $L_1^1$ is the only link of the first type; and
  the axes of the links of the second type ($L_2^1$, $L_3^1$, $L_4^1$) lie in the plane $\Pi$ defined by the axes of rotation $k_0$ and $i_1$.

FIG. 2 shows a mechanism belonging to the second family. Such a mechanism has exactly four links, and:
  the axes of the links of the first type ($L_1^2$, $L_2^2$) lie in a common plane, without any of them coinciding with the axis $k_0$. Thus they belong to a plane bundle of straight lines passing through the center C; and
  the axes of the links of the second type ($L_3^2$, $L_4^2$) belong to a plane bundle of straight lines lying in the plane $\Pi$ defined by the axes of rotation $k_0$ and $i_1$.

Compared with the mechanisms of the second family, the mechanisms of the first family present greater stiffness against forces in the plane $\Pi$, while the mechanisms of the second family present greater stiffness against forces perpendicular to said plane $\Pi$.

A mechanism of the second family requires a universal or double spherical joint, which is difficult to construct and permits movements of small amplitude only. In contrast, a mechanism of the first family presents a larger number of colinear joints (4 in alignment along $i_1$ and 4 along $k_0$), and that requires great precision in fabrication. Consequently, fabrication difficulty is more or less equivalent for both families, but the first family permits turning about $k_0$ through an amplitude that is about twice that permitted by the second family.

In addition, a mechanism of the first family presents inertia about $k_0$ that is greater than that of a mechanism of the second family.

Figure 3:
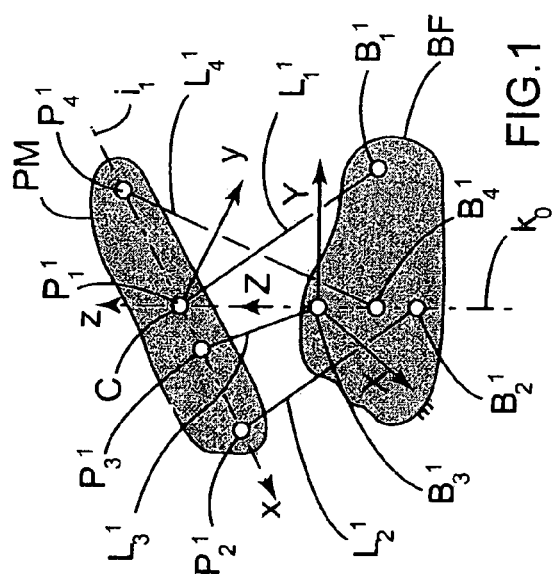
FIG. 3, a theoretical diagram of a passive mechanism in a third embodiment of the invention.

FIG. 3 shows a mechanism belonging to the third family. Such a mechanism has exactly four links $L_1^3$, $L_2^3$, $L_3^3$, $L_4^3$ and the axes of the links of the first type belong to a bundle of straight lines centered in the center of spherical motion C, while the axes of the links of the second type are colinear and do not pass through said center of spherical motion C.

Together, the three above-described families cover all possible mechanisms of the invention having exactly four links.

Figure 4:
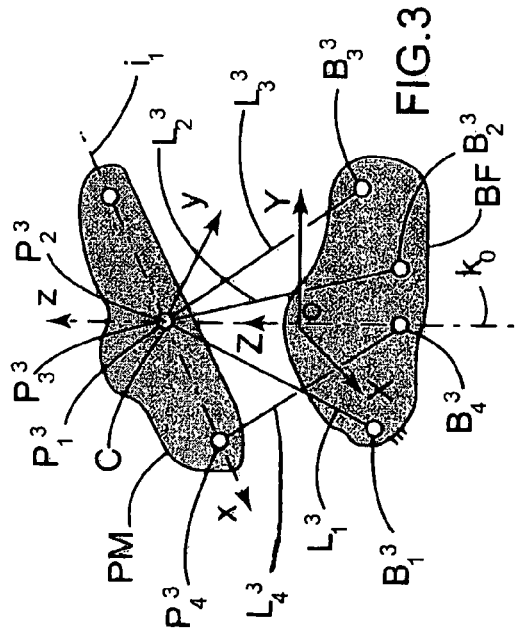
FIG. 4, a theoretical diagram of a passive mechanism in a fourth embodiment of the invention.

A mechanism of the fourth family is obtained by adding one or more links of the first or second type to a mechanism of the first, second, or third family. For example, FIG. 4 shows a mechanism of the fourth family obtained by adding to the mechanism of FIG. 2 a link $L_5^4$ of the first type and a link $L_6^4$ of the second type.

The mechanisms of the fourth family present at least the same inertia about $k_0$ as the mechanisms of the first family, and a turning range about said axis $k_0$ of the same order as that of the second family.

A mechanism of the invention having exactly four links, each connected to the base and to the platform via a universal joint and a spherical joint (or two spherical joints) is not overconstrained. In all other configurations, the mechanism is overconstrained; in particular, mechanisms of the fourth family are necessarily overconstrained since they have five or more links.

Whatever the embodiment selected, a mechanism of the invention presents very great stiffness compared with mechanisms known in the prior art. This is due to the fact that the base and the platform are interconnected by a larger number of parallel kinematic linkages, and each linkage is constituted by a single link having joints at its ends. By comparison, in the mechanism described in above-mentioned document U.S. Pat. No. 5,966,991, the base and the platform are interconnected by only two parallel kinematic linkages, each formed by two links in series. It is known that a wrist is made stiffer by increasing the number of kinematic linkages in parallel and reducing the number of links in series.

When all the links of the mechanism are connected to the base and to the platform via a universal joint and a spherical joint or via two spherical joints, the links are subjected solely to forces in traction and in compression: this makes it possible to obtain a greater stiffness/mass ratio than in prior art devices, and in particular than in the mechanism of document U.S. Pat. No. 5,966,991.

In the fourth family, using five or more links makes the mechanism overconstrained, which leads to internal stresses and risks of jamming, and requires greater precision in fabrication (small tolerances) specifically to minimize those risks.

Figure 5:
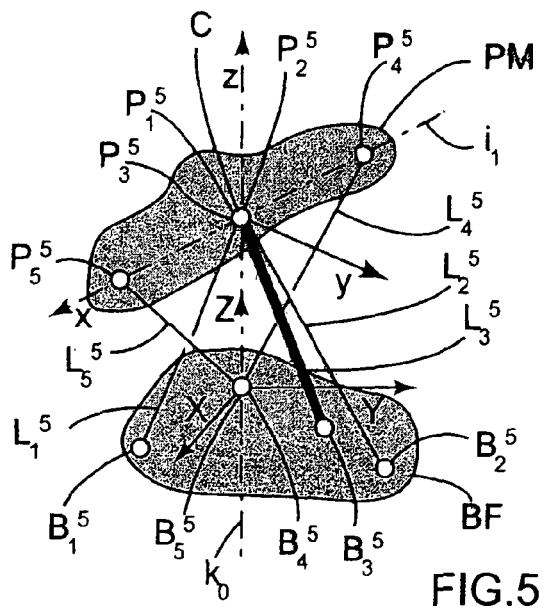
FIG. 5, a theoretical diagram of a passive mechanism in a fifth embodiment of the invention.

Nevertheless, those drawbacks are attenuated in a mechanism of the invention, specifically because its great stiffness limits mechanical deflections, which can be the cause of jamming. A mechanism of the invention that is overconstrained by using links in excess of four also presents advantages compared with a four-link mechanism: better stiffness/mass, stiffness/size, strength/mass, and strength/size ratios, greater resilience, and reduced backlash. In addition, such an overconstrained mechanism can be made using structural elements that are simpler, such as cables and compression beams; a compression beam is a structural element that is intended to be stressed essentially (ideally solely) in compression. For example, FIG. 5 shows an overconstrained mechanism belonging to the fourth family, in which the link $L_3^5$ is a compression beam, while the other links ($L_1^5$, $L_2^5$, $L_4^5$, $L_5^5$) are cables.

The use of cables for making links that are to be stressed in traction only presents an additional advantage: because of their flexibility, cables make it possible to obtain the necessary degrees of freedom without any need to provide mechanical joints at their connection points to the base and to the platform.

It can be seen that mechanisms of the invention do not present surfaces in sliding contact. This makes it possible to avoid using lubricants (which is particularly advantageous for space applications), to increase the working lifetime of the mechanism, and to guarantee high precision all along said lifetime. In addition, the absence of sliding contact enables the mechanism to be miniaturized without any need to modify its structure. Consequently, the invention is suitable for making micromechanical devices and microelectromechanical systems (MEMS).

In numerous applications, and particularly but not exclusively in space applications, it is necessary to be able to deploy an orienting mechanism, i.e. to be able to change the distance between the base BS and the platform PM. This applies for example to an artificial satellite antenna which needs to go from a storage position in which it is held close to the body of said satellite, to a utilization position in which it needs to be far enough away to enable it to be oriented in three-dimensional space.

Figure 6B:
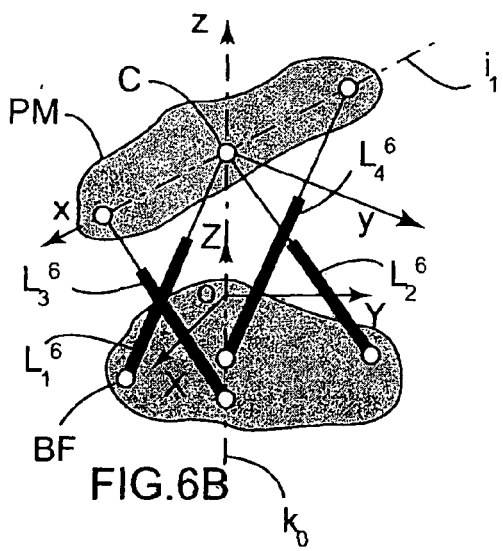
FIGS. 6A and 6B, a self-deployable mechanism in a variant of said second embodiment of the invention, shown respectively in the retracted position and the deployed position.
Figure 6A:
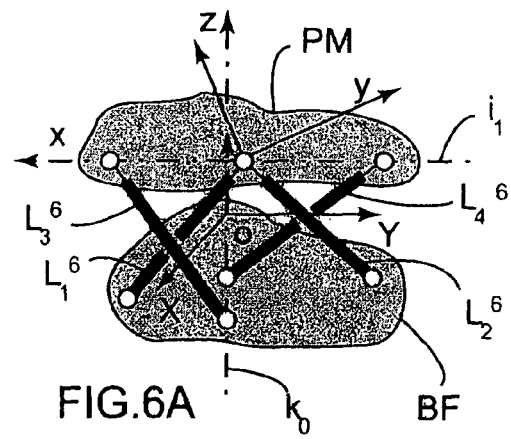

FIGS. 6A and 6B show that a mechanism of the invention can be made self-deploying by using links of variable length $L_1^6, L_2^6, L_3^6, L_4^6$ that are constituted by bistable telescopic arms, that are capable of passing from a fully-retracted position (FIG. 6A) to a fully-deployed position (FIG. 6B) and vice versa. It is of interest to observe that there is no need for all of the telescopic arms to be active, i.e. controlled by an actuator. For example, in FIGS. 6A-6B, it suffices to actuate the arm $L_3^6$ to deploy or retract the mechanism. Alternatively, it is possible to actuate the arm $L_2^6$, but that leads to movement of the platform relative to the base that is more complex.

On observing FIGS. 6A and 6B, it will be understood that in order to ensure that the mechanism is capable of deploying/retracting, it is necessary for the connection points between the links and the base BF or the platform PM to present at least some additional degrees of freedom (other than in rotation about the axes $k_0$ and/or $i_1$).

Figure 7:
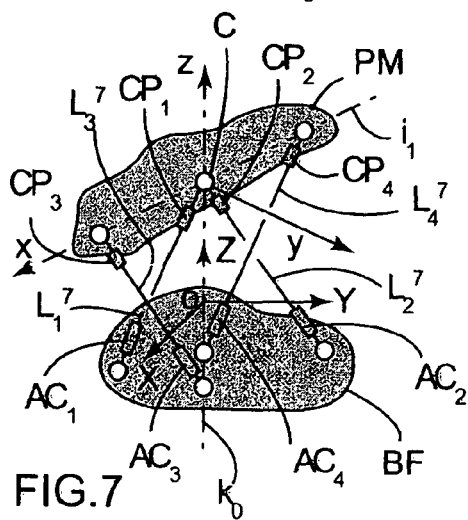
FIG. 7, a mechanism constituting another variant of said second embodiment of the invention, including integrated actuators and sensors, for actively damping vibration and/or compensating deflections of said mechanism.

The architecture of the mechanism of the invention makes it easy to integrate sensors and actuators in the links in order to provide an "intelligent" mechanism that presents adaptive behavior in order to damp vibration and/or compensate deflections of the system in active manner. An example of such an "intelligent" mechanism is shown in FIG. 7, in which each link $L_i^7$ (i=1 to 4) is fitted with a sensor $CP_i$ and an actuator $AC_i$ integrated therein. The greatest level of integration can be obtained by using portions in the links that are made out of piezoelectric ceramic or magnetostrictive and/or electrostrictive alloys. These portions act simultaneously to provide a structural function, as sensors, and as actuators.

Figure 8:
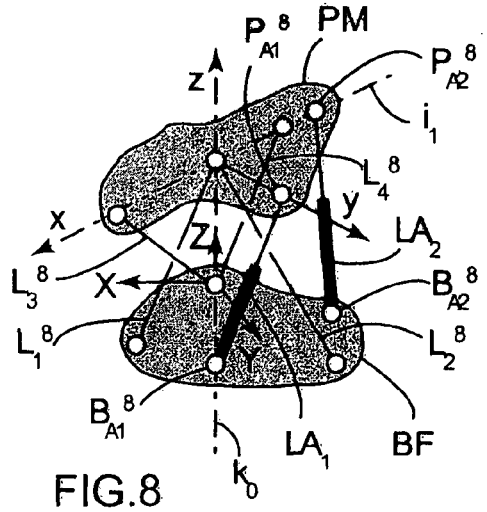
FIG. 8, a mechanism constituting yet another variant of said second embodiment of the invention, including prismatic actuators for orienting the platform in three-dimensional space by turning about two imposed axes.

In order to orient the platform PM in three-dimensional space, the mechanism can be actuated in various different ways. A first possibility, shown in FIG. 8, consists in adding one or more additional active kinematic linkages to a passive mechanism of the invention. In the example of FIG. 8, two additional telescopic links $LA_1$ and $LA_2$ having prismatic actuators are connected between the platform PM (via spherical joints $PA_1^8$, $PA_2^8$) and to the base PM (via universal joints $BA_1^8$, $BA_2^8$) of a mechanism of the type shown in FIG. 2. More precisely, the first connection point $BA_1^8$ of the additional link $LA_1$ lies on the axis $k_0$, while its second connection point $PA_1^8$ is an arbitrary point on the platform PM that does not lie on any of the axes of rotation. For the additional link $LA_2$, its first connection point $BA_2^8$ is an arbitrary point on the base BF that does not lie on any of the axes of rotation, while its second connection point $PA_2^8$ lies on the axis $i_1$. It will be understood that actuating the additional link $LA_1$ induces turning about the axis $i_1$ alone, while actuating the additional link $LA_2$ induces turning about the axis $k_0$ alone, i.e. these movements in rotation are decoupled.

Figure 9:
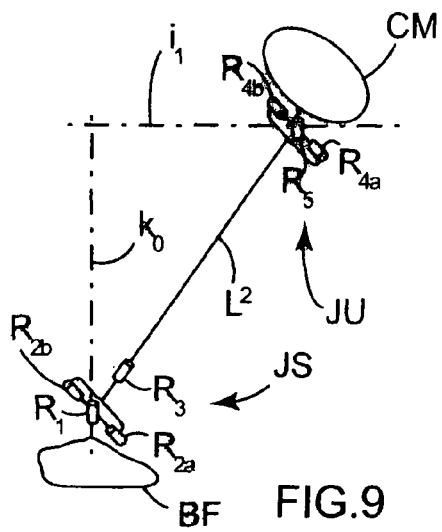
FIG. 9, a detail view of a mechanism constituting yet another variant of said second embodiment of the invention, having joints that are capable of being actuated to orient the platform in three-dimensional space by turning about two imposed axes.

A second possibility consists in actuating two kinematic joints of the system, in positions that have been selected appropriately. For example, FIG. 9 shows a detail of a link $L^2$ of the mechanism of the FIG. 2 type connected to the base BF via a spherical joint JS and to the platform via a universal joint JU. These two joints are constituted by three and by two revolute joints respectively: $R_1, R_2$ (a, b) and $R_3$ for the spherical joint JS; $R_4$ (a, b) and $R_5$ for the universal joint JU. The mechanism can be actuated by actuating two revolute joints selected from $R_1, R_3, R_4$ (a, b), and $R_5$. In position, actuating the joint $R_1$ produces turning movement of the platform PM about the axis $k_0$ alone, while actuating the joint $R_3$ produces turning movement about the axis $i_1$ alone. This decoupling of the turning movements is made possible by the particular orientation of the axes of the joints: thus, if the axis of $R_1$ were not in alignment with $k_0$, actuating it would also affect turning of the platform about $i_1$.

The mechanism may also be actuated by using joints belonging to two different links.

FIG. 10 shows an example of an application of the mechanism of the invention, and more particularly a mechanism belonging to the first family. The device of FIG. 10 is a support for a stereoscopic camera CM, adapted for space applications (planetary exploration). The camera CM, shown as being essentially cylindrical in shape, needs to be capable of being oriented in elevation by turning about its own axis $i_1$, and in azimuth by turning about the vertical axis $k_0$ that is fixed relative to the base BF. In addition, the device as a whole must be capable of going from a storage position in which it lies on the surface of the base BF, to an operational position, as shown in the figure. The mechanism has one link of the first type $L_1^{10}$, and three links of the second type $L_2^{10}, L_3^{10}$, and $L_4^{10}$, one of which ($L_3^{10}$) is telescopic. The connections between the links and the base BF ($B_1^{10}, B_2^{10}, B_3^{10}$, and $B_4^{10}$) constitute spherical joints, while the connections with the camera CM ($P_1^{10}, P_2^{10}, P_3^{10}$, and $P_3^{10}$) constitute universal joints; the spherical and universal joints are in fact obtained by combining revolute joints, as in FIG. 9 (in a variant, elastic joints could be used, at least for inactive degrees of freedom). The three desired movements are completely decoupled and can be controlled by three independent actuators:

- a first motor MA controls the spherical joint $B_1^{10}$ (in fact one of its component revolute joints) to turn about the axis of the link $L_1^{10}$ in order to orient the camera CM in azimuth;
- a second motor ME controls the spherical joint $B_2^{10}$ (in fact one of its component revolute joints) to turn about the axis of the link $L_2^{10}$ to orient the camera CM in elevation; and
- a prismatic actuator MD controls deployment and retraction of the mechanism by changing the length of the link $L_3^{10}$: it can be seen that sufficient elongation of this link brings the camera CM into contact with the base. It can be seen that the other links are of constant length.

The system enables turning through about 160° to 175° in azimuth and about 330° to 350° in elevation.

The system was dimensioned on the assumption that the camera has a mass of 1 kilogram (kg) and is subjected to the gravity field of the earth. The links are made of Al 7075T6 aluminum alloy, joints having a total mass of 2 kg, and motors MA and ME each having a mass of 0.6 kg, which is feasible. A safety margin constituted by a factor of 2 was used for dimensioning purposes. The dimensioning led to an estimated mass of 3.8 kg (not including motors); applying a margin of 1.25 leads to an estimate of 4.8 kg, excluding the deployment motor MD. This can be compared with the 8.8 kg (deployment motor likewise excluded) of the Pancam Mast Assembly (PMA) of NASA's Mars Exploration Rover: see Warden, Cross, and Harvison "Pancam Mast Assembly on Mars Rover", Aerospace Mechanisms Symposium, 2004.

In addition to reducing mass, which is an essential parameter for a space mission, the parallel architecture of the mechanism of the invention makes it possible to obtain a particularly high degree of stiffness.

What is claimed is:

1. A parallel spherical mechanism with two degrees of freedom for connecting a body to a fixed base in such a manner as to enable it to be oriented in three dimensions by turning about a first axis that is fixed relative to said fixed base, and about a second axis that is fixed relative to said body for orienting wherein, while said body is oriented by turning about said first and second axes, said axes intersect at a point, called a center of spherical motion, which is situated in said body and is fixed with respect to said fixed base and wherein:

it comprises at least four links, each of said links being connected to said fixed base via a first connection point and to said body for orienting via a second connection point, and each link belonging to a first type or a second type, there being at least one link of each type, in which:
in the link(s) of the first type, the first connection point is at any point of said fixed base that does not lie on said first axis, and the second connection point coincides with said center of spherical motion situated in said body for orienting: and
in the link(s) of the second type, the first connection point lies on said first axis and the second connection point lies on said second axis;
each connection point of said links lying on said first and/or second axis presents at least one degree of freedom in rotation about said axis.

2. A mechanism according to claim 1, in which said first and second connection points are made using two spherical joints, or one spherical joint and one universal joint.

3. A mechanism according to claim 2, in which at least one of said links is of variable length, so as to enable the distance between said fixed base and said center of spherical motion situated in said body for orienting to be modified.

4. A mechanism according to claim 3, in which said or each link of variable length is a bistable telescopic link.

5. A mechanism according to claim 3, in which at least one of said links of variable length includes a linear actuator in order to vary its length in active manner.

6. A mechanism according to claim 3, in which at least one of said links of variable length includes an integrated actuator and sensor for damping vibration or compensating deflections of said mechanism.

7. A mechanism according to claim 1, in which at least one of the connection points that does not lie on either of the two axes of rotation constitutes a rigid connection.

8. A mechanism according to claim 1, in which at least one of the connection points that does not lie on either of the two axes of rotation constitutes an elastic connection.

9. A mechanism according to claim 1 having exactly four links and in which the first connection points of said links of the first type are in alignment along a straight line that passes through said center of spherical motion but does not coincide with said first axis of rotation, and the axes of the links of the second type lie in the plane defined by said first and second axes of rotation.

10. A mechanism according to claim 9, further comprising at least one additional link of the first or second type.

11. A mechanism according to claim 10, in which said links are constituted by compression beams or cables, at least one link being constituted by a compression beam.

12. A mechanism according to claim 1, having exactly four links and in which the axes of the links of the first type are coplanar, with none of them being in alignment with said first axis of rotation, while the axes of the links of the second type belong to a plane bundle of straight lines lying in the plane defined by said first and second axes of rotation.

13. A mechanism according to claim 1, having exactly four links and in which the axes of the links of the first type belong to a bundle of straight lines centered on the center of spherical motion, while the axes of the links of the second type are colinear and do not pass via said center of spherical motion.

14. A mechanism according to claim 1, including at least two actuators for orienting said body in three dimensions by rotation about said first and second axes of rotation.

15. A mechanism according to claim 14, in which said two actuators comprise:
a first prismatic actuator connected to said base by a first connection point lying on said first axis and to said body for orienting via a second connection point not lying on either axis of rotation; and
a second prismatic actuator connected to said base via a connection point not lying on either axis of rotation, and to said body for orienting via a second connection point lying on said second axis.

16. A mechanism according to claim 14, in which the two actuators are designed to actuate one or two of said connection points in turning.

* * * * *